Nov. 3, 1964   S. N. WEISSMAN ETAL   3,155,753
PROCESS OF FILLING A RIGID HOLLOW STRUCTURE
WITH FOAMED-IN-PLACE PLASTIC FOAM
Filed Feb. 4, 1963
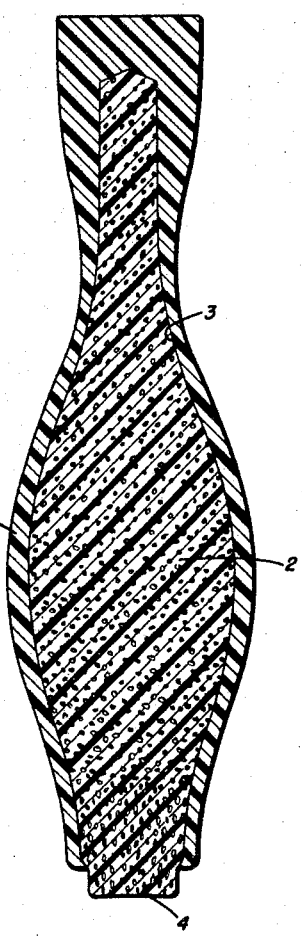
STANLEY N. WEISSMAN
GEORGE L. MATTHIAS
INVENTORS
BY *Francis H. Deef*
ATTORNEY

United States Patent Office 3,155,753
Patented Nov. 3, 1964

3,155,753
PROCESS OF FILLING A RIGID HOLLOW STRUCTURE WITH FOAMED-IN-PLACE PLASTIC FOAM
Stanley N. Weissman, Cedar Grove, and George L. Matthias, Belleville, N.J., assignors to W. R. Grace & Co., a corporation of Connecticut
Filed Feb. 4, 1963, Ser. No. 255,923
3 Claims. (Cl. 264—45)

The present invention relates to a novel and useful process for preparing a foamed plastic shaped structure. More particularly, it relates to an improved process for forming a plastic shaped structure having a foamed core and an outer plastic layer.

It is known in the art that various plastics have high abrasion resistance, good machinability, and accordingly such plastics have found widespread use as a substitute for objects previously fabricated from wood. In many instances, however, such a substitution is not desirable due to particular characteristics which are related to the density of the final product. For example, in the fabrication of bowling pins it is desired that the pin have a specific density and, correspondingly, a specific center of gravity so as to be interchangeable with other pins and give reproducible results game after game. For this reason, the art has generally turned to a hollow bowling pin when they are to be fabricated from plastics since the density of the plastic does not correspond to the density of wood (see U.S. Patent 3,044,777). Hollow pins, however, lack the proper sound characteristic and bounce characteristics. It would be highly desirable, therefore, to produce such an article with a hard outer surface and a foamed core so that the density and correspondingly, the center of gravity could be changed so as to be the same as the wood it replaces.

While it might be expected that the sound and bounce characteristics of the bowling pin might be satisfactorily modified by filling the pin with foam, it has been found that the foamed center upon cooling contracts within the pin and correspondingly does not completely fill the hollow portion. In some instances, the foamed inner core upon shrinkage becomes so loose that it will actually rattle within the hollow bowling pin. In other instances, the center of gravity of the pin is distorted so the true balance is not obtained. Obviously, if a process could be developed which would allow a solid bonding between the foam and outer core of such a shaped structure, it would receive widespread acceptance in the foamed-in-place molding field.

It is an object of the present invention to provide a simple and convenient method of joining a shaped structure and a plastic foam. Another object is to provide an improved process for forming a foamed product having a solid outer layer. A still further object is to provide a shaped plastic structure having a solid plastic outer layer and an interior foam core which is integrally bonded to the outer layer. Other objects will become apparent as the description of the invention proceeds.

The objects are accomplished by the present invention which provides an improvement in the process of adhering a plastic foam to a plastic shaped structure, the improvement comprising melting a surface of said plastic structure and then foaming a plastic in contact with said surface while the surface is in a softened condition.

In a preferred embodiment of the present invention, the improved process is employed in the filling of a hollow plastic shaped structure with a foamed-in-place plastic foam, the improvement comprising melting the interior surface of said hollow plastic shaped structure and then foaming the plastic within the hollow structure while the interior surface is in a softened condition.

The term "plastic" is used to signify any of the conventional polymeric materials which are thermoplastic and suitable for convention molding procedures. The term includes polyesters, such as poly(ethylene terephthalate), the polycarbonamides such as 6-nylon and 66-nylon and other such materials as are well-known in the art. A particularly prefered plastic is high density polyethylene (i.e. having a density above about 0.940) homopolymer and copolymers. The preparation of such materials is disclosed in U.S. Patent 2,825,721. However polypropylene and many other plastics would likewise by operable.

The expression "shaped structure" signifies any structure in which it is desirable to increase the adherebility of a plastic foam on its surface. In a preferred embodiment of the present invention, the structure is hollow and the improved process is employed to form a foamed core by the well-known "foamed-in-place" procedure.

The expressions "plastic foam" and "foaming a plastic" merely signify the conventional process whereby a "blowing agent" or "foaming agent" is employed in a molten plastic to cause the formation of bubbles.

The expression "blowing agent" (foaming agent) is used in its conventional sense to mean any material suitable for incorporation into plastics to form bubbles therein by the application of heat, reduction in pressure and the like as is known in the art. Among the suitable blowing agents which may be used in the practice of the present invention are gases such as nitrogen or the very volatile liquid fluorocarbons such as 1,2-dichloro-tetrafluoroethane and the like. The more preferred blowing agents, however, are the chemical agents which decompose with the liberation of a gas as one of decomposition products. Such materials include barium azodicarboxate, 4,4'-oxybis(benzenesulfonylhydrazide), bisbenzenesulfonyl hydrazide, 4,4'-oxybis(benzenesulfonyl semicarbazide), dinitrosopentamethylenetetramine, tryhydrazinosym.-triazine, and 1,1'-azobisformamide. Other blowing agents are disclosed in U.S. Patents 2,532,243, 2,804,435, 2,819,231, 2,927,904, 2,948,664 and others. A particularly preferred blowing agent is azodicarbonamide as disclosed in U.S. Patent 2,804,435.

The invention is hereinafter more fully described by reference to the drawing.

The figure shows in cross section the molded product produced in accordance with the present invention.

In the figure, the outer wall 1 of the bowling pin blank is in intimate contact with the foamed-in-place core 2. In practice the inner wall 3 of the hollow bowling pin blank is heated to a temperature above the melting point of the plastic contained in the outer wall 1. When the inner wall 3 is in a sufficiently softened condition, the foam is placed within the core 2 of the hollow blank and allowed to expand so as to completely fill the interior cavity. In general, it is desirable to slightly overfill the interior portion of the blank so that the foam protrudes slightly from the open portion 4 of the blank.

The following examples are given to illustrate the invention and are not intended to limit it in any manner.

EXAMPLE 1

Pellets of a commercial high density polyethylene copolymer (containing about 1% of butene-1) having a density of 0.950 and a melt index of 0.4 are dry blended in a conventional double cone blender with 1% by weight of azodicarbonamide ($NH_2.CO.NH.NH.CO.NH_2$) for 10 minutes.

A solid bowling pin blank is drilled and then cored on a lathe to give a hollow bowling pin blank substantially as shown in the drawing (without the interior foamed core). The approximate dismensions of the bowling pin blank are length 15½ inches, diameter across top 2¾ inches, diameter across neck 1⅞ inches and maximum diameter of 4½ inches. After the removal of the solid interior, the walls of the bowling pin blank are approximately ⅜ inch in thickness.

The hollow bowling pin blank is mounted on a support. A metal tube is inserted to the top of the interior cavity of the blank and air heated to a temperature of about 800° F. is forced through the tube into the cavity where it is expelled through the open end. The tube is withdrawn slowly from the cavity (about 5 minutes) so that it completely melts the inner surface of the bowling pin blank.

The aforementioned polyethylene pellets are run through an extruder at 375° F. and then fed from a metal tube into the cavity of the bowling pin blank from top to bottom to fill it with foam. The metal tube is gradually withdrawn (in about 2 minutes) as the interior cavity becomes full. The bowling pin blank is allowed to air cool for about 15 minutes and then is removed from the support.

After cooling overnight, the foam filled blank is sectioned by cutting a ¼ inch thick slice longitudinally through the center. The interior plastic foam fuses to the outside plastic layer with sufficient strength so that it cannot be removed from the section with hand pressure.

*Control*

The procedure of Example 1 is repeated omitting, however, the heating of the interior of the bowling pin blank prior to foaming the plastic in the hollow interior. When the bowling pin blank is sectioned into a ¼ inch thick slice, as in Example 1, there is no bonding between the foam and inner surface of the blank. In fact, the foam core completely falls away from the outside plastic wall due to shrinkage of the core which takes place when the foam cools.

EXAMPLE 2

When the procedure of Example 1 is repeated employing 1.5% azodicarbonamide and a high density polyethylene homopolymer having a density of 0.960 and a melt index of 5.0 substantially the same results are obtained.

While the amount of blowing agent in the plastic is not critical, it is generally desirable to employ from about 0.05 to about 10% by weight, based on the weight of the polymer, when the blowing agent is a chemical blowing agent. Preferably, from about 0.2 to about 6% by weight of blowing agent is employed. Similarly, the temperatures may be selected as desired, but of course it must be above the softening point of the polymer. For polyethylene homopolymer and copolymers a temperature of from about 270° F. to about 525° F. is suitable with temperatures of from about 270° F. to about 350° F. being preferred. With other polymers, higher or lower temperatures may be desirable.

While the invention has been described with reference to specific embodiments, many equivalent modifications will be apparent to those skilled in the art from a reading of the foregoing without a departure from the inventive concept.

What is claimed is:

1. In the process of filling a rigid hollow plastic shaped structure with a foamed-in-place plastic foam, the improvement which comprises melting the interior surface of said rigid hollow plastic shaped structure and then foaming a molten plastic within the hollow structure while the interior surface is in a softened condition.

2. The process of claim 1 wherein the hollow plastic shaped structure is composed of high density polyethylene.

3. The process of claim 1 wherein the plastic foam is composed of high density polyethylene.

References Cited in the file of this patent

UNITED STATES PATENTS

| | | |
|---|---|---|
| 2,962,407 | Aykanian | Nov. 29, 1960 |
| 2,976,577 | Gould | Mar. 28, 1961 |
| 2,977,639 | Barkhuff et al. | Apr. 4, 1961 |
| 2,983,962 | Merz et al. | May 16, 1961 |
| 3,015,132 | Bunting | Jan. 2, 1962 |

FOREIGN PATENTS

| | | |
|---|---|---|
| 641,073 | Canada | May 8, 1962 |